(12) United States Patent
Ye et al.

(10) Patent No.: US 11,349,570 B2
(45) Date of Patent: May 31, 2022

(54) OPTICAL COMMUNICATION METHOD AND APPARATUS

(71) Applicant: Alcatel Lucent, Nozay (FR)

(72) Inventors: Chenhui Ye, Shanghai (CN); Xiaofeng Hu, Shanghai (CN); Kaibin Zhang, Shanghai (CN)

(73) Assignee: Alcatel Lucent, Nozay (FR)

( * ) Notice: Subject to any disclaimer, the term of this patent is extended or adjusted under 35 U.S.C. 154(b) by 505 days.

(21) Appl. No.: 16/316,173

(22) PCT Filed: Mar. 13, 2017

(86) PCT No.: PCT/CN2017/076491
§ 371 (c)(1),
(2) Date: Jan. 8, 2019

(87) PCT Pub. No.: WO2018/006617
PCT Pub. Date: Jan. 11, 2018

(65) Prior Publication Data
US 2021/0281321 A1   Sep. 9, 2021

(30) Foreign Application Priority Data
Jul. 8, 2016  (CN) .......................... 201610537633.5

(51) Int. Cl.
*H04B 10/27* (2013.01)
*H04Q 11/00* (2006.01)

(52) U.S. Cl.
CPC ......... *H04B 10/27* (2013.01); *H04Q 11/0067* (2013.01); *H04Q 2011/0086* (2013.01)

(58) Field of Classification Search
CPC ............... H04B 10/27; H04Q 11/0067; H04Q 2011/0086
(Continued)

(56) References Cited

U.S. PATENT DOCUMENTS

2006/0035643 A1   2/2006   Vook et al.
2006/0093359 A1*  5/2006   Lee .................... H04J 14/0226
                                                    398/70
(Continued)

FOREIGN PATENT DOCUMENTS

CN   101232328 A   7/2008
CN   103475410 A   12/2013
(Continued)

OTHER PUBLICATIONS

International Search Report PCT/ISA/210 for International Application No. PCT/CN2017/076491 dated Jun. 1, 2017.
(Continued)

*Primary Examiner* — Dalzid E Singh
(74) *Attorney, Agent, or Firm* — Harness, Dickey & Pierce, P.L.C.

(57) ABSTRACT

Embodiments of the present disclosure relate to a method and apparatus for optical communication. For example, there is provided a method implemented at a passive optical network device configured to perform high-rate communication via a bandwidth-limited link. The method comprises: receiving, via the bandwidth-limited link, a training signal from an optical network unit; obtaining a delay signal by delay-sampling the training signal; determining, based on the delay signal, a first channel response of the bandwidth-limited link, the first channel response characterizing change of the training signal caused by the bandwidth-limited link; and compensating, based on the first channel response, a communication signal received via the bandwidth-limited link from the optical network unit, to reduce distortion of the communication signal. A corresponding apparatus is also disclosed.

9 Claims, 7 Drawing Sheets

(58) Field of Classification Search
USPC .......................................................... 398/168
See application file for complete search history.

(56) References Cited

U.S. PATENT DOCUMENTS

| | | | |
|---|---|---|---|
| 2008/0037981 A1* | 2/2008 | Mukojima | H04Q 11/0067 |
| | | | 398/10 |
| 2009/0238580 A1 | 9/2009 | Kikuchi | |
| 2012/0134669 A1* | 5/2012 | Xu | H04J 14/0282 |
| | | | 398/38 |
| 2013/0330070 A1 | 12/2013 | Yu | |
| 2014/0254697 A1 | 9/2014 | Zhang et al. | |
| 2015/0172088 A1 | 6/2015 | Arambepola et al. | |
| 2016/0285546 A1* | 9/2016 | Zeng | H04B 10/07 |
| 2019/0245623 A1* | 8/2019 | Campos | H04B 10/504 |

FOREIGN PATENT DOCUMENTS

| | | |
|---|---|---|
| CN | 104468450 A | 3/2015 |
| CN | 104735013 A | 6/2015 |
| CN | 105009502 A | 10/2015 |
| EP | 3051900 A1 | 8/2016 |
| JP | H11-225112 A | 8/1999 |
| JP | 2007-329862 A | 12/2007 |
| JP | 2008-312071 A | 12/2008 |
| JP | 2013-009023 A | 1/2013 |
| JP | 2014-230102 A | 12/2014 |
| JP | 2014-230202 A | 12/2014 |
| JP | 2016-517663 A | 6/2016 |
| WO | WO-2014/164762 A1 | 10/2014 |
| WO | WO-2015/045697 A1 | 4/2015 |
| WO | WO-2015062544 A1 | 5/2015 |

OTHER PUBLICATIONS

Office Action for corresponding Chinese Application No. 201610537633.5 dated Feb. 25, 2020.
University of Electronic Science and Technology of China. 'Master Dissertation' *CNKI*. Oct. 2009.
Office Action for European Application No. 17 823 430.8 dated Jun. 14, 2021.
Office Action and Search Report for Chinese Application No. 201610537633.5 dated Aug. 27, 2020.
Office Action for Korean Application No. 10-2019-7003813 dated Aug. 19, 2020 and English translation.
Office Action for corresponding Japanese Application No. 2019-500390 dated Dec. 22, 2020.
Search Report for corresponding European Application No. 17823430.8 dated Jan. 15, 2020.
Bangjiang Lin et al., "Time-domain channel estimator for polarization interleaving direct-detection orthogonal frequency-division multiplexing passive optical network," Optical Engineering, vol. 55, Jun. 2016.
Office Action for corresponding Japanese Application No. 2019-500390 dated Jan. 28, 2020.

* cited by examiner

OPTICAL COMMUNICATION METHOD AND APPARATUS

CROSS-REFERENCE TO RELATED APPLICATIONS

This application is a national phase under 35 U.S.C. § 371 of PCT International Application No. PCT/CN2017/076491 which has an International filing date of Mar. 13, 2017, which claims priority to Chinese Application No. 201610537633.5, filed Jul. 8, 2016, the entire contents of each of which are hereby incorporated by reference.

FIELD

Embodiments of the present disclosure generally relate to a method and apparatus for optical communication, and more specifically, to a method and apparatus implemented at a passive optical network device and an optical network unit.

BACKGROUND

As the time for Next-Generation Ethernet Passive Optical Network (NG-EPON) standardization approaches, one of the most promising options is using the current 10 Gbps fiber/optical components to support 25 Gbps per channel or even higher data rate. Considering the data format options respectively for the uplink and the downlink, 4-level Pulse Amplitude Modulation (PAM4) and Duo-Binary Amplitude Modulation (DB) have been regarded as a most suitable combination.

However, new technical challenges emerge in such solutions because the quality of the high level formatted symbol (i.e., PAM4 or DB) is highly dependent on the overall channel response determined by the cascaded electric/optical components. These challenges include bandwidth-limitation induced Inter-Symbol Interference (ISI) distortion especially for DB and multi-level PAM induced power budget shortage especially for PAM4.

SUMMARY

Embodiments of the present disclosure provide a method and apparatus implemented at a passive optical network device and an optical network unit.

In accordance with a first aspect of the present disclosure, there is provided a method implemented at a passive optical network device configured to perform high-rate communication via a bandwidth-limited link. The method comprises: receiving, via the bandwidth-limited link, a training signal from an optical network unit; obtaining a delay signal by delay-sampling the training signal; determining, based on the delay signal, a first channel response of the bandwidth-limited link, the first channel response characterizing change of the training signal caused by the bandwidth-limited link; and compensating, based on the first channel response, a communication signal received via the bandwidth-limited link from the optical network unit, to reduce distortion of the communication signal.

In some embodiments, determining the first channel response comprises: determining the first channel response by approximating the delay signal to a predetermined reference signal.

In some embodiments, determining the first channel response comprises: reading the training signal previously stored in the passive optical network device; and obtaining the reference signal by delaying and adding the training signal.

In accordance with a second aspect of the present disclosure, there is provided a method implemented at a passive optical network device configured to perform high-rate communication via a bandwidth-limited link. The method comprises: receiving, via an uplink, a training signal from an optical network unit; determining, based on the training signal, a second channel response of the uplink, the second channel response characterizing change of the training signal caused by a downlink; and compensating, based on the second channel response, a communication signal to be transmitted via the downlink to an optical network unit, to reduce distortion to be suffered by the communication signal.

In some embodiments, determining the second channel response comprises: determining, based on the training signal, a first intermediate channel response of the uplink, the first intermediate channel response characterizing change of the training signal caused by the uplink; and determining the second channel response at least partially based on the first intermediate channel response.

In some embodiments, determining the second channel response at least partially based on the first intermediate channel response comprises: transmitting, via the downlink, the training signal to the optical network unit; receiving, via the uplink, the training signal returned from the optical network unit; determining, based on the returned training signal, a second intermediate channel response, the second intermediate channel response characterizing change of the training signal caused by both the downlink and the uplink; and determining the second channel response based on the first intermediate channel response and the second intermediate channel response.

In accordance with a third aspect of the present disclosure, there is provided a method implemented at an optical network unit configured to perform high-rate communication via a bandwidth-limited link. The method comprises: receiving, via the downlink, a training signal from the passive optical network device; transferring the training signal from the downlink to uplink; and transmitting, via the uplink, the training signal back to the passive optical network device.

In some embodiments, the method comprises: receiving, via the downlink, the training signal transmitted from the passive optical network device; and receiving, via the downlink, the communication signal transmitted from the passive optical network device.

In some embodiments, the method comprises: transmitting, via the uplink, the training signal to the passive optical network device; and transmitting, via the uplink, a communication signal to the passive optical network device.

In accordance with a fourth aspect of the present disclosure, there is provided an apparatus implemented at a passive optical network device configured to perform high-rate communication via a bandwidth-limited link. The apparatus comprises: a first receiving module configured to receive, via the bandwidth-limited link, a training signal from an optical network unit; a delay module configured to obtain a delay signal by delay-sampling the training signal; a first determining module configured to determine, based on the delay signal, a first channel response of the bandwidth-limited link, the first channel response characterizing change of the training signal caused by the bandwidth-limited link; and a first compensating module configured to compensate, based on the first channel response, a communication signal received via the bandwidth-limited link from the optical network unit, to reduce distortion of the communication signal.

In accordance with a fifth aspect of the present disclosure, there is provided an apparatus implemented at a passive optical network device configured to perform high-rate communication via a bandwidth-limited link. The apparatus comprises: a second receiving module configured to receive, via an uplink, a training signal from an optical network unit; a second determining module configured to determine, based on the training signal, a second channel response of the uplink, the second channel response characterizing change of the training signal caused by a downlink; and a second compensating module configured to compensate, based on the second channel response, a communication signal to be transmitted via the downlink to an optical network unit, to reduce distortion to be suffered by the communication signal.

In accordance with a sixth aspect of the present disclosure, there is provided an apparatus implemented at an optical network unit configured to perform high-rate communication via a bandwidth-limited link. The apparatus comprises: a third receiving module configured to receive, via the downlink, a training signal from the passive optical network device; a transferring module configured to transfer the training signal from the downlink to uplink; and a transmitting module configured to transmit, via the uplink, the training signal back to the passive optical network device.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1:
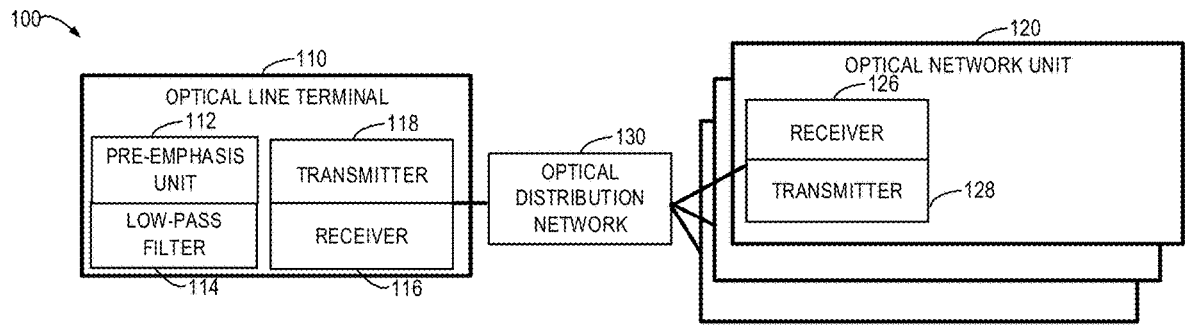
FIG. 1 illustrates a schematic diagram of an optical communication system in a traditional solution.

Preferred embodiments of the present disclosure will be described in more details below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text can also include other explicit and implicit definitions.

Smart hardware designs or software techniques have been raised against shortage of power budget or ISI issues, but these solutions have not taken the cost related issues into account, like whether Analog-Digital Converter (ADC), Digital-Analog Converter (DAC) or Digital Signal Processor (DSP) is placed in Optical Line Terminal (OLT) or Optical Network Unit (ONU), or whether the ONU should also be equipped with ADC/DSP for downlink impaired stream recovery. Issues existing in the traditional solution will be introduced in details below respectively for the downlink direction and the uplink direction.

For downlink direction, the distorted PAM4 signal after transmission leads to either detection failure or high requirement on receiving power level, or the ADS/DSP is required in the ONU for signal recovery. But using ADC/DSP in ONU is an approach lacking cost-effectiveness. However, if the ADC/DSP is not provided in the ONU, it is impossible for the ONU to know its channel response and accordingly generate a corresponding adaptive compensation. Furthermore, if a potential format like 8-level Pulse Amplitude Modulation (PAM8) is used in future, no solution has been proposed regarding how the ADC/DSP will assist in implementing the use of the potential format on the current 10 Gbps device.

For uplink direction, after the signal is transmitted in a bandwidth-limited channel, a strong low-pass filtering effect (equivalent to DB) is expected. In order to achieve DB of good quality, it is required to precisely control the end-toend bandwidth. However, on account of component instability issues resulted from various factors, such as temperature, aging or individual difference, all the DB signals from various ONUs differ from each other in quality. Therefore, there emerges one question about whether the ADC/DSP is needed and a further question regarding where the ADC/DSP is placed to save the costs and ensure the performance to the greatest extent. Furthermore, a potential uplink format, like PAM4, is used by the ONU, it is unknown whether the centralized ADC/DSP can help recover DB-PAM4.

FIG. 1 illustrates a schematic diagram of an optical communication system 100 in a traditional solution. The optical communication system 100 includes an optical line terminal 110, one or more optical network units 120 and an optical distribution network 130. The optical line terminal 110 includes a pre-emphasis unit 112 with a fixed pre-emphasis function, a low-pass filter 114 with a fixed waveform shaping function, a receiver 116 and a transmitter 118. The optical network unit 120 includes a receiver 126 and a transmitter 128. In the downlink, the optical line terminal 110 transmits, via the transmitter 118, the PAM4 signal processed by the pre-emphasis unit 112 to the optical network unit 120. In the uplink, the optical network unit 120 transmits, via the transmitter 128, the DB signal directly to the optical line terminal 110.

The optical communication system 100 utilizes direct detection approach based PAM4 and DB signal transmission respectively for downlink and uplink. Its most significant advantage is cost saving. However, due to the limitation of the pre-emphasis unit 112 with a fixed pre-emphasis function for the downlink and the low-pass filter 114 for the uplink in the optical line terminal 110, the signals for both the downlink and the uplink are unsatisfactory to some degree. Specifically, the PAM4 signal recovered at the optical network unit 120 and the DB signal recovered at the optical line terminal 110 degrade to some extent. In addition, the pre-emphasis unit 112 providing the fixed pre-emphasis function cannot always satisfy one or more of the optical network units 120 in the whole optical communication system 100 because one or more of the optical network units 120 have various response and different distances away from the optical line terminal 110.

Figure 2:
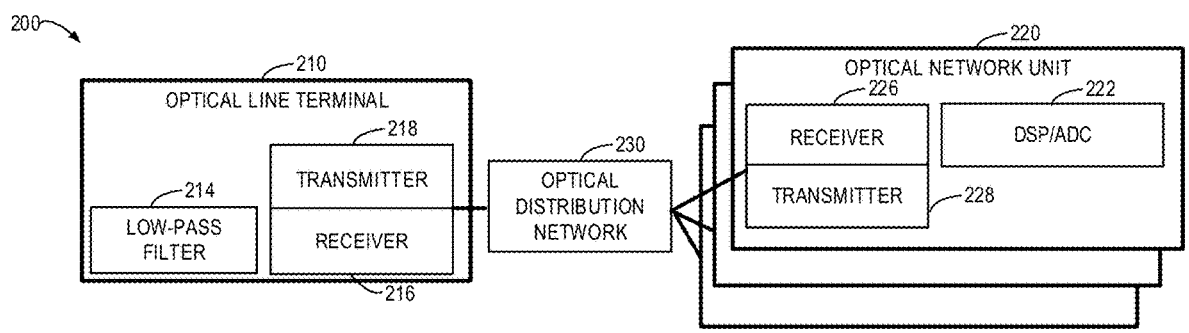
FIG. 2 illustrates a schematic diagram of a further optical communication system in a traditional solution.

FIG. 2 illustrates a schematic diagram of a further optical communication system 200 in the traditional solution. The optical communication system 200 includes an optical line terminal 210, one or more optical network units 220 and an optical distribution network 230. The optical line terminal 210 includes a low-pass filter 214, a receiver 216 and a transmitter 218. The optical network unit 220 includes an ADC/DSP 222, a receiver 226 and a transmitter 228. In the downlink, the optical line terminal 210 transmits, via the transmitter 218, the PAM4 signal directly to the optical network unit 220, which recovers the PAM4 signal via the ADC/DSP 222 having channel learning and compensation functions. In the uplink, the optical network unit 220 transmits, via the transmitter 128, the DB signal processed by the ADC/DSP 222 to the optical line terminal 210, which recovers the DB signal via the low-pass filter 214.

As shown in FIG. 2, the optical communication system 200 improves the transmission performance of the PAM4 signal using the ADC/DSP 222. However, the provision of the ADC/DSP 222 in each individual ONU makes the optical communication system 200 lack cost effectiveness. Besides, although the optical communication system 200 facilitates the recovery of the DB signal using the low-pass filter 214 and the ADC/DSP 222 for the uplink, the optical communication system 200 still cannot satisfy the uplink transmission with the PAM4 and the use of DB-PAM as a reception method in the 10 Gbps system.

Figure 3:
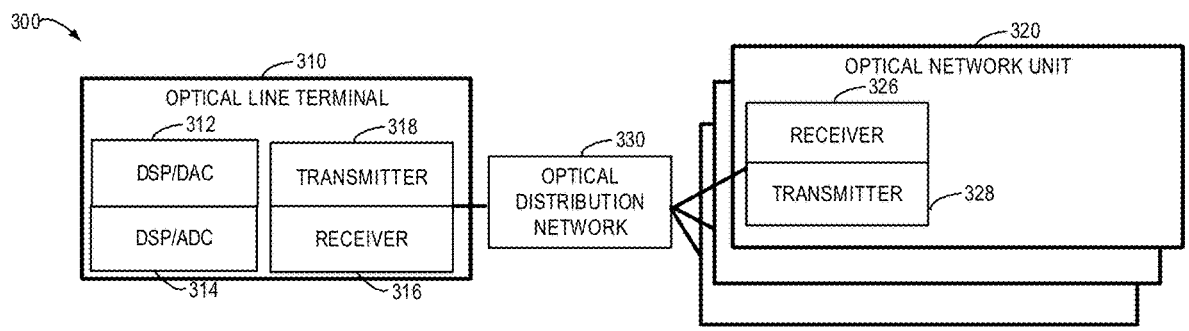
FIG. 3 illustrates a schematic diagram of an optical communication system in accordance with embodiments of the present disclosure.

To at least partially solve the above and other potential problems and defects, embodiments of the present disclosure provide a solution for optical communication. FIG. 3 illustrates a schematic diagram of an optical communication system 300 in accordance with embodiments of the present disclosure. The optical communication system 300, for example, can be Next-Generation Ethernet Passive Optical Network (NG-PON) system. The optical communication system 300 can include an optical line terminal 310, one or more optical network units 320 and an optical distribution network 330. The optical line terminal 310 can include a DSP/DAC 314 for pre-processing (also known as pre-compensation), a DSP/ADC 312 for post-processing (also known as post-compensation), a receiver 316 and a transmitter 318. The optical network unit 320 can include a receiver 326 and a transmitter 328.

In the uplink, the optical network unit 320 can transmit, via the transmitter 328, the DB signal directly to the optical line terminal 310. The optical line terminal 310 can post-process the signal by the DSP/ADC 312 to recover the signal. The signal is not limited to the DB signal and can also be any signal that can be used for optical communication, such as the PAM4 signal and the like. In the following text, the post-processing process will be described in details with reference to FIG. 4.

In the downlink, the optical line terminal 310 can transmit, via the transmitter 318, the signal (e.g., the PAM4 signal) pre-processed by the DSP/DAC 314 to the optical network unit 320. Since the signal is pre-processed, the optical network unit 320 can directly detect the signal. The signal is not limited to the PAM4 signal and can also be any signal that can be used for optical communication, such as the PAM8 signal and the like. In the following text, the pre-processing process will be described in details with reference to FIGS. 5 and 6.

As shown in FIG. 3, the shared DSP/ADC 312 and DSP/DAC 314 are centralized in the optical line terminal 310, such that the performance of the uplink and the downlink can be satisfactorily maintained while the optical network unit 320 is kept simple and compact. A flowchart of a post-processing process or method 400 in accordance with embodiments of the present disclosure will be described below with reference to FIG. 4. In some embodiments, the process 400, for example, can be implemented at the DSP/ADC 312. For the uplink transmission, since the NRZ (or even PAM4) signal, for example, are transmitted via the bandwidth-limited link and accordingly shaped into the DB (or DB-PAM4) signal, an improved adaptive Least Mean Square (LMS) approach can be used for determining and compensating channel loss. For example, a Half-Symbol Delay Sample (HSDS) method can be used as the improved adaptive Least Mean Square (LMS) approach. In the HSDS method, the ideal DB symbols for example can serve as the reference signal to help recover the signal after transmission over the bandwidth-limited link, and the recovered signal is approximate to the DB signal instead of original NRZ signal.

At 410, the optical line terminal 310 can receive, via the bandwidth-limited link, the training signal from the optical network unit. For example, in some embodiments, data rate of the training signal can be set to 2× Baud rate (e.g., 28 GB/s).

At 420, the optical line terminal 310 can obtain a delay signal by delay-sampling the training signal. In some embodiments, the optical line terminal 310 can perform a half-symbol delay-sampling on the training signal. The half-symbol delay-sampling means that the sampling location is delayed by a half symbol compared with the standard waveform sampling location.

At 430, the optical line terminal 310 can determine, based on the delay signal, an uplink channel response in the bandwidth-limited link (hereinafter referred as "first channel response"). The first channel response characterizes change of the training signal caused by the uplink in the bandwidth-limited link, including for example influence over the training signal in amplitude and phase. In some embodiments, the uplink can include the transmitter in the optical network unit 320, the optical fiber link and the receiver in the optical line terminal 310. In some embodiments, the optical line terminal 310 can read the training signal previously stored therein and obtain the reference signal by delaying and adding the training signal. Delaying and adding mean that the training signal is firstly delayed by 1 bit for example to obtain the delayed training signal, and the delayed training signal and the original training signal are then added to obtain the reference signal. Furthermore, the optical line terminal 310 can determine the first channel response by approximating the delay signal to the predetermined reference signal. For example, the optical line terminal 310 can approximate the delay signal to the reference signal by a recursive algorithm, and use a convergence result of the recursive algorithm while approximating the delay signal to the reference signal as the first channel response. In some embodiments, the first channel response can be represented by several taps Feed Forward Equalization (FFE) filters with low complexity.

At 440, the optical line terminal 310 can compensate, based on the uplink channel response, the communication signal received from the optical network unit 320 via the uplink of the bandwidth-limited link, to reduce the distortion of the communication signal. In some embodiments, the optical line terminal 310 can compute a reciprocal compensating filter of the first channel response and compensate the received communication signal by the compensating filter. In some embodiments, the compensation can be implemented by the following equation:

$$CH_1 \otimes CH_2 = \delta(0) + \delta(1)$$

$CH_1$ represents an actual uplink channel response (i.e., first channel response) and $CH_2$ represents a response brought by the compensating filter. $\delta(0)+\delta(1)$ obtained from the convolution of $CH_1$ and $CH_2$ represents an ideal channel deformation, in which the communication signal is delayed by 1 bit for example and added up with the original communication signal. For example, the communication signal of the PAM2 signal is recovered, via the ideal channel deformation, to the ideal DB-PAM2 signal, and the ideal PAM2 signal can be recovered from the DB-PAM2 signal.

Because the optical line terminal 310 post-compensates the channel loss in the process 400, the optical line terminal 310 can satisfactorily recover the communication signal, so as to satisfy the uplink transmission with the PAM4 and the use of DB-PAM as a reception method in the 10 Gbps system.

Figure 4:
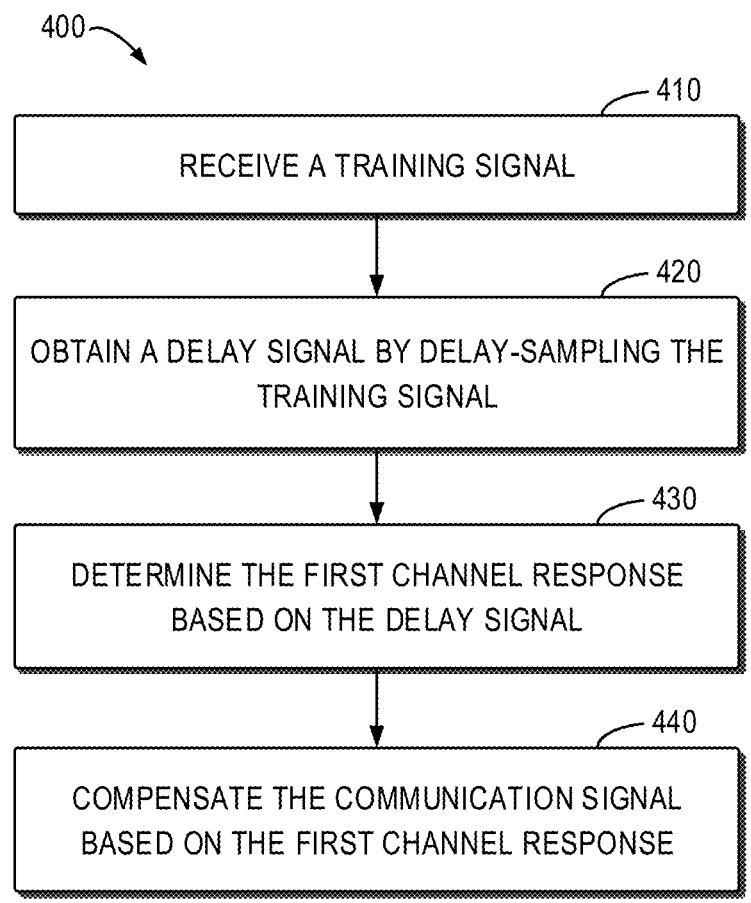
FIG. 4 illustrates a flowchart of a post-processing process or method in accordance with embodiments of the present disclosure.
Figure 5:
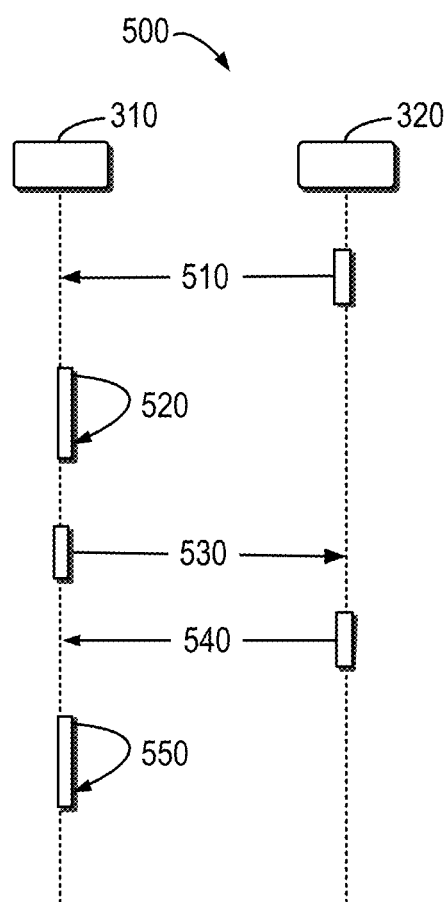
FIG. 5 illustrates a flowchart of a pre-processing process or method in accordance with embodiments of the present disclosure.

As described above, apart from the post-processing process shown in FIG. 4, the optical line terminal 310 can also pre-process the signal in accordance with embodiments of the present disclosure. FIG. 5 illustrates an interaction diagram of a pre-processing process 500 in accordance with embodiments of the present disclosure. In some embodiments, the actions executed at the optical line terminal 310 in the process 500 for example can be implemented at the DSP/DAC 312.

It will be understood that, for the downlink transmission, in order to enable direct detection of the signal in the optical network unit 320, the signal can be pre-processed in the optical line terminal 310 to compensate distortion of the signal suffered during the transmission via the bandwidth-limited link. Furthermore, the downlink channel response (hereinafter referred to as "second channel response") can be determined in order to pre-process the signal. As such, the mere uplink channel response (hereinafter referred to as "first intermediate channel response") and cascaded downlink and uplink channel response (hereinafter referred to as "second intermediate channel response") can be separately determined, and the second channel response is subsequently determined by the determined second intermediate channel response and the first intermediate channel response.

Before executing the actions shown in FIG. 5, the optical line terminal 310 can establish the downlink between the optical line terminal 310 and the optical network unit 320 by transmitting a connection signal to the optical network unit 320. The connection signal, for example, can be a signal without pre-processing and a signal with data rate lower than the transmission bandwidth. In some embodiments, the connection signal, for example, can be the NRZ signal at 1× Baud rate (e.g., 14 GB/s), and because the connection signal has a data rate lower than the transmission bandwidth (such as 28 GB/s), the downlink can be successfully established. In other embodiments, if the downlink cannot be established using the NRZ signal at the 1× Baud rate, a symbol identical to the previous odd symbol can be set in the even symbol location of the signal, such that the data rate of the connection signal is reduced by half to 0.5× Baud rate. The connection signal is not limited to the NRZ signal, and can also be any signal that can be used for optical communication, such as the PAM4 signal and the like.

Next, according to FIG. 5, the optical line terminal 310 can receive (510), via the uplink, the training signal from the optical network unit 320. In some embodiments, the training signal, for example, can be the NRZ signal at 2× Baud rate (e.g., 28 GB/s). However, since the even symbol is identical to the previous odd symbol in the training signal, the data rate of the training signal is equivalent to 1× Baud rate. The training signal is not limited to the NRZ signal, and can also be any signal that can be used for optical communication, such as the PAM4 signal and the like.

In response to receiving the training signal, the optical line terminal 310 can determine (520), based on the training signal, the first intermediate channel response. The first intermediate channel response characterizes change of the training signal caused by the uplink, including for example influence over the training signal in amplitude and phase. In some embodiments, the uplink can include the transmitter in the optical network unit 320, the optical fiber link and the receiver in the optical line terminal 310. In some embodiments, the optical line terminal 310 can determine the first intermediate channel response by Least Mean Square (LMS)-based channel approximation. For example, the optical line terminal 310 can determine the first intermediate channel response under the 1× Baud rate by the LMS-based channel approximation. In some embodiments, the first intermediate channel response can be represented by several taps Feed Forward Equalization (FFE) filters with low complexity.

Next, the optical line terminal 310 can transmit (530), via the downlink, the training signal to the optical network unit 320. In response to receiving the training signal via the downlink, the optical network unit 320 can transfer the training signal to the uplink and transmit back to the optical line terminal 310. In the following text, a transfer process will be described in details with reference to FIG. 7.

Subsequently, the optical line terminal 310 can receive (540), via the uplink, the training signal returned from the optical network unit 320. In response to receiving the training signal again, the optical line terminal 310 can determine, based on the returned training signal, the second intermediate channel response. The second intermediate channel response characterizes change of the training signal caused by both the downlink and the uplink, including for example influence over the training signal in amplitude and phase. In some embodiments, the cascaded downlink and uplink can include the transmitter in the optical line terminal 310, a downlink optical fiber link, the receiver in the optical network unit 320, an uplink optical fiber link and the receiver in the optical line terminal 310. In some embodiments, the optical line terminal 310 can determine the first intermediate channel response by Least Mean Square (LMS)-based channel approximation. For example, the optical line terminal 310 can determine the second intermediate channel response under the 1× Baud rate by the LMS-based channel approximation. In some embodiments, the second intermediate channel response can be represented by several taps Feed Forward Equalization (FFE) filters with low complexity.

Then, the optical line terminal 310 can determine (550), based on the determined second intermediate channel response and the first intermediate channel response, the second channel response. For example, the second channel response can be determined by dividing the second intermediate channel response by the first intermediate channel response. In some embodiments, the second channel response can be represented by several taps Feed Forward Equalization (FFE) filters with low complexity.

Furthermore, the optical line terminal 310 can compensate, based on the second channel response, the communication signal to be transmitted via the downlink to the optical network unit 320, to reduce the distortion to be suffered by the communication signal. The communication signal, for example, can be the PAM4 signal, PAM8 signal or any signal that can be used for optical communication. In some embodiments, the optical line terminal 310 can compute an inverse function of the second channel response, multiplies the computed inverse function with the communication signal to be transmitted to pre-process the communication signal, and transmit the pre-processed communication signal via the downlink. For example, the optical line terminal 310 can transmit, via the downlink, the pre-processed PAM4 signal at 1× Baud rate. In some embodiments, the compensation can be performed by the following equation:

$$CH \otimes CH^{-1} = \delta(0)$$

CH represents an actual downlink channel response (i.e., second channel response) and $CH^{-1}$ represents an inverse function of the second channel response computed by the DSP/DAC 312. $\delta(0)$ obtained from the convolution of CH and $CH^{-1}$ represents an ideal lossless channel response. For example, the signal, such as the PAM4 signal, will be recovered, via the ideal channel transmission, to the ideal PAM4 signal.

Because the optical line terminal 310 pre-compensates the channel loss in the process 500, the optical network unit 320 can satisfactorily receive the communication signal, such that the PAM4 signal, even the PAM8 signal, can also be well received by direct 4-level or 8-level identification with good quality.

Figure 6:
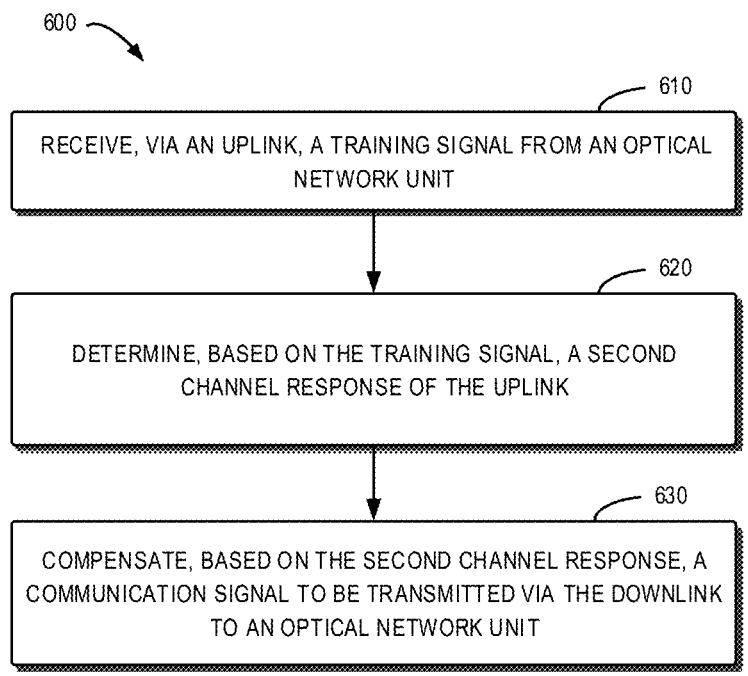
FIG. 6 illustrates a flowchart of a pre-processing process or method in accordance with embodiments of the present disclosure.

FIG. 6 illustrates a flowchart of a process or method 600 implemented at the optical line terminal 310 during the pre-processing process described above with reference to FIG. 5. In some embodiments, the process 600, for example, can be implemented at the DSP/DAC 312. At 610, the optical line terminal 310 can receive, via the uplink, the training signal from the optical network unit.

At 620, the optical line terminal 310 can determine, based on the training signal, the second channel response of the uplink, the second channel response characterizing change of the training signal caused by a downlink. For example, in some embodiments, the second channel response can be determined in the following manner. First of all, the first intermediate channel response of the uplink can be determined based on the training signal. As described above, the first intermediate channel response characterizes the change of the training signal caused by the uplink. The second channel response can be determined at least partially based on the first intermediate channel response. For example, in some embodiments, the training signal can be transmitted, via the downlink, to the optical network unit, and the training signal returned from the optical network unit are subsequently received via the uplink. Based on the returned training signal, the second intermediate channel response can be determined, the second intermediate channel response characterizing change of the training signal caused by both downlink and uplink, and then the second channel response can be determined based on the first intermediate channel response and the second intermediate channel response.

At 630, the optical line terminal 310 can compensate, based on the second channel response, the communication signal to be transmitted to the optical network signal via the downlink, so as to reduce the distortion to be suffered by the communication signal.

Figure 7:
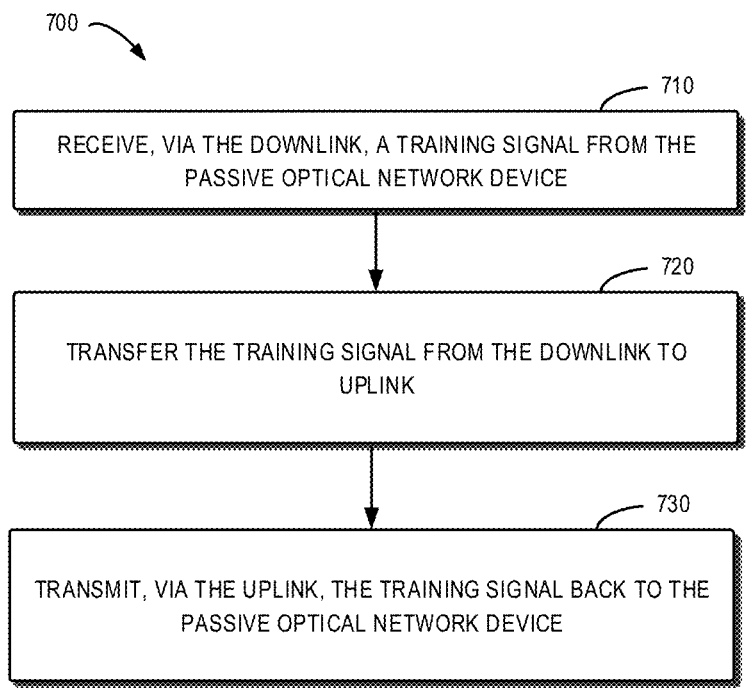
FIG. 7 illustrates a flowchart of a transmission process or method in accordance with embodiments of the present disclosure.

FIG. 7 illustrates a flowchart of a transmission process or method 700 in accordance with embodiments of the present disclosure. In some embodiments, the process 700, for example, can be implemented at the optical network unit 320. The optical network unit 320 executes the process 700 to cooperate with the optical line terminal 310 to implement the above described functions/operations.

At 710, the optical network unit 320 can receive, via the downlink, the training signal from the optical line terminal 310. At 720, the optical network unit 320 can transfer the training signal from the downlink to the uplink without recovering the training signal. At 730, the optical network unit 320 can transmit, via the uplink, the training signal back to the optical line terminal 310. The process 700 can facilitate the determination of the second intermediate channel response at the optical line terminal 310. In some embodiments, the process 700 can also include receiving, via the downlink, the training signal transmitted from the optical line terminal 310, and receiving, via the downlink, the communication signal transmitted from the optical line terminal 310. In some embodiments, the process 700 can also include transmitting, via the uplink, the training signal to the optical line terminal 310, and transmitting, via the uplink, the communication signal to the optical line terminal 310.

Figure 8:
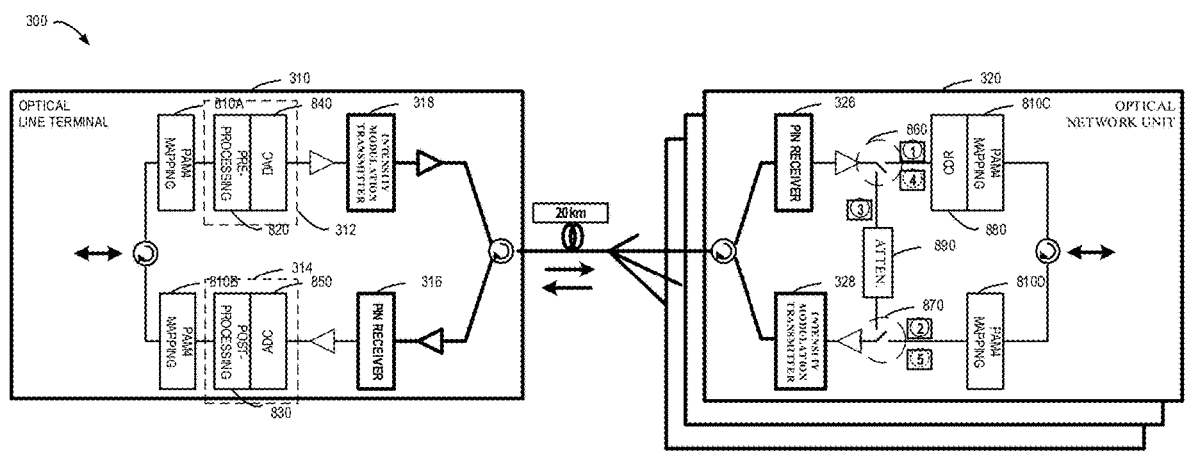
FIG. 8 illustrates a schematic diagram of an example optical communication system in accordance with embodiments of the present disclosure.

FIG. 8 illustrates a schematic diagram of a specific implementation of the optical communication system 300 in accordance with embodiments of the present disclosure. The transmission process of the signal will be described below with reference to the example implementation. In FIG. 8, the DSP/DAC 312 is implemented as a pre-processing module 820 and a DAC 840, and the DSP/ADC 314 is implemented as a post-processing module 830 and an ADC 850. For the sake of a clear description, the transmission process can be divided into 5 situations: (1) establishing the downlink; (2) determining the first intermediate channel response: (3) determining the second intermediate channel response; (4) downlink transmission; (5) uplink transmission.

As shown in FIG. 8, in case of establishing the downlink, the connection signal in the optical line terminal 310 can be transmitted to the optical network unit 320 by PAM4 mapping module 810A, pre-processing module 820, DAC 840, an electrical amplifier, intensity modulation transmitter 318 and an optical amplifier. In some embodiments, the pre-processing module 810 does not pre-process the connection signal. In response to receiving the connection signal, the optical network unit 320 can enable a connection between a PIN receiver 326 and a Clock and Data Recovery (CDR) module 880, such that the connection signal passes through the PIN receiver 326, the CDR module 880 and the PAM mapping module 810C so as to be processed in the optical network unit 320. The connection signal can be any signal that can be used for optical communication, such as the NRZ signal and the like, and can be transmitted at a data rate of 1× Baud rate for example. Similarly, the communication signal goes through the same transmission process for the downlink transmission. The communication signal can be any signal that can be used for optical communication, such as the PAM4 signal, PAM8 signal and the like, and can be transmitted at a data rate of 1× Baud rate for example.

In case of determining the first intermediate channel response, the optical network unit 320 enables a connection between the PAM4 mapping module 810D and the intensity modulation transmitter 328, such that the training signal can be transmitted to the optical line terminal 310 by the PAM4 mapping module 810D, the electrical amplifier and the intensity modulation transmitter 328. At the optical line terminal 310, the training signal passes through the optical amplifier, the PIN receiver 316, the ADC 850, the post-processing module 830 and the PAM mapping module 810B for processing in the optical line terminal 310. The training signal can be any signal that can be used for optical communication, such as the NRZ signal and the like, and can be transmitted at a data rate of 1× Baud rate for example. Similarly, the communication signal goes through the same transmission process for the uplink transmission. The communication signal can be any signal that can be used for optical communication, such as the NRZ signal, PAM4 signal and the like, and can be transmitted at a data rate of 2× Baud rate for example.

In case of determining the second intermediate channel response, the training signal in the optical line terminal 310 can be transmitted to the optical network unit 320 through the PAM4 mapping module 810D, the pre-processing module 820, the DAC 840, the electrical amplifier, the intensity modulation transmitter 318 and the optical amplifier. In some embodiments, the pre-processing module 820 does not pre-process the training signal. In response to receiving the training signal, the optical network unit 320 can enable a connection between the PIN receiver 326 and the intensity modulation transmitter 328, such that the training signal enters into the intensity modulation transmitter 328 directly from the PIN receiver 326, and is transmitted to the optical line terminal 310 for transfer from the downlink to the uplink. At the optical line terminal 310, the training signal passes through the optical amplifier, the PIN receiver 316, the ADC 850, the post-processing module 830 and the PAM mapping module 810B for processing in the optical line terminal 310. The training signal can be any signal that can be used for optical communication, such as the NRZ signal and the like, and can be transmitted at a data rate of 1× Baud rate for example.

The switching modules 860 and 870 can be used for implementing the above described switchover of the transmission process. The switching modules 860 and 870, for example, can be any apparatuses that can implement the switchover, such as switches, exchangers and the like.

Figure 9:
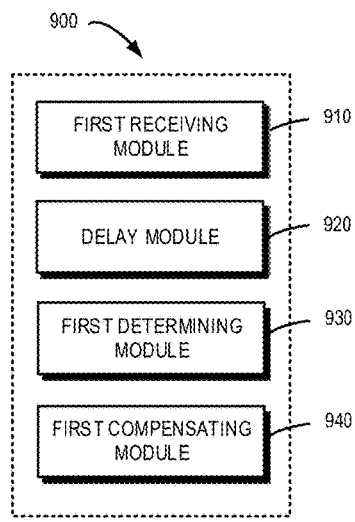
FIG. 9 illustrates a schematic block diagram of an apparatus for post-processing in accordance with embodiments of the present disclosure.

FIG. 9 illustrates a schematic block diagram of an apparatus for post-processing in accordance with embodiments of the present disclosure. In some embodiments, the apparatus 900, for example, can be implemented at the DSP/ADC 312 or directly serve as the DSP/ADC 312 per se. As shown, the apparatus 900 can include a first receiving module 910, a delay module 920, a first determining module 930 and a first compensating module 940.

The first receiving module 910 can be configured to receive, via the bandwidth-limited link, the training signal from the optical network unit. The delay module 920 can be configured to obtain a delay signal by delay-sampling the training signal. The first determining module 930 can be configured to determine, based on the delay signal, the first channel response of the bandwidth-limited link, the first channel response characterizing the change of the training signal caused by the bandwidth link.

In some embodiments, the first determining module 930 can be further configured to determine the first channel response by approximating the delay signal to the predetermined reference signal. In some embodiments, the first determining module 930 can be further configured to read the training signal previously stored in the passive optical network device; and delaying and adding the training signal to obtain the reference signal.

In some embodiments, the first compensating module 940 can be configured to compensate, based on the first channel response, the communication signal received from the optical network unit via the bandwidth-limited link, to reduce the distortion of the communication signal.

Figure 10:
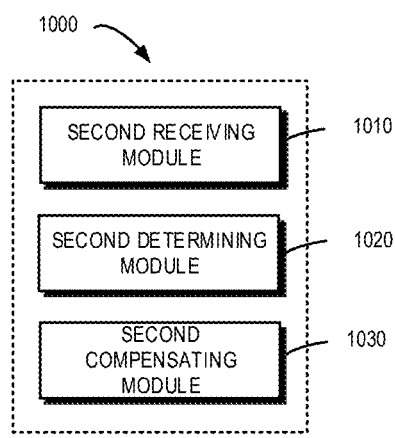
FIG. 10 illustrates a schematic block diagram of an apparatus for pre-processing in accordance with embodiments of the present disclosure.

FIG. 10 illustrates a schematic block diagram of an apparatus for pre-processing in accordance with embodiments of the present disclosure. In some embodiments, the apparatus 1000, for example, can be implemented at the DSP/DAC 314 or directly serve as the DSP/DAC 314 per se. As shown, the apparatus 1000 can include a second receiving module 1010, a second determining module 1020 and a second compensating module 1030.

The second receiving module 1010 can be configured to receive, via the uplink, the training signal from the optical network unit. The second determining module 1020 can be configured to determine, based on the training signal, the second channel response of the uplink, the second channel response characterizing the change of the training signal caused by a downlink. In some embodiments, the second determining module 1020 can be further configured to determine, based on the training signal, the first intermediate channel response of the uplink, the first intermediate channel response characterizing change of the training signal caused by the uplink; and determine, at least partially based on the first intermediate channel response, the second channel response.

In some embodiments, the second determining module 1020 can be further configured to: transmit, via the downlink, the training signal to the optical network unit; receive, via the uplink, the training signal returned from the optical network unit; determine the second intermediate channel response based on the returned training signal, the second intermediate channel response characterizing change of the training signal caused by both downlink and uplink; and determine the second channel response based on the first intermediate channel response and the second intermediate channel response.

In some embodiments, the second compensating module 1030 can be configured to compensate, based on the second channel response, the communication signal to be transmitted to the optical network unit via the downlink, to reduce the distortion to be suffered by the communication signal.

Figure 11:
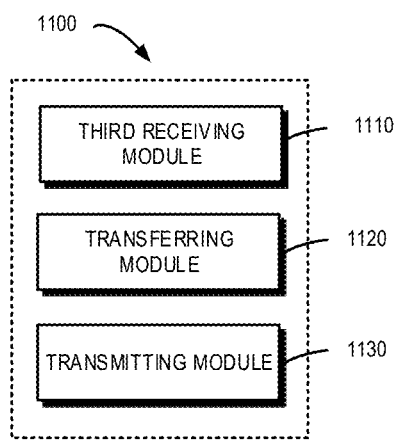
FIG. 11 illustrates a schematic block diagram of an apparatus for transmission in accordance with embodiments of the present disclosure.

FIG. 11 illustrates a schematic block diagram of an apparatus 1100 for transmission in accordance with embodiments of the present disclosure. In some embodiments, the apparatus 1100, for example, can be implemented at the optical network unit 310 or directly serve as the optical network unit 310 per se. As shown, the apparatus 110 can include a third receiving module 1110, a transferring module 1120 and a transmitting module 1130.

The third receiving module 1110 can be configured to receive, via the downlink, the training signal from the optical line terminal 320. In some embodiments, the third receiving module 1110 can be further configured to: receive, via the downlink, the training signal transmitted from the optical line terminal 320; and receive, via the downlink, the communication signal transmitted from the optical line terminal 320. The transferring module 1120 can be configured to transfer the training signal from the downlink to the uplink. The transmitting module 1130 can be configured to transmit, via the uplink, the training signal back to the optical line terminal 320. In some embodiments, the transmitting module 1130 can be further configured to: transmit, via the uplink, the training signal to the optical line terminal 320; and transmit, via the uplink, the communication signal to the optical line terminal 320.

It should be understood that these apparatuses illustrated in FIGS. 9 to 11 all can be implemented as hardware devices. That is, the various modules in the apparatuses 900 to 1100 can be implemented using any currently known or to be developed hardware modules, devices, components or any other combinations thereof. For example, these modules can be partially or fully realized as circuit blocks, universal integrated circuits, Application-Specific Integrated Circuit (ASIC), System-on-Chip (SOC) and/or Field Programmable Gate Array (FPGA) etc.

Figure 12:
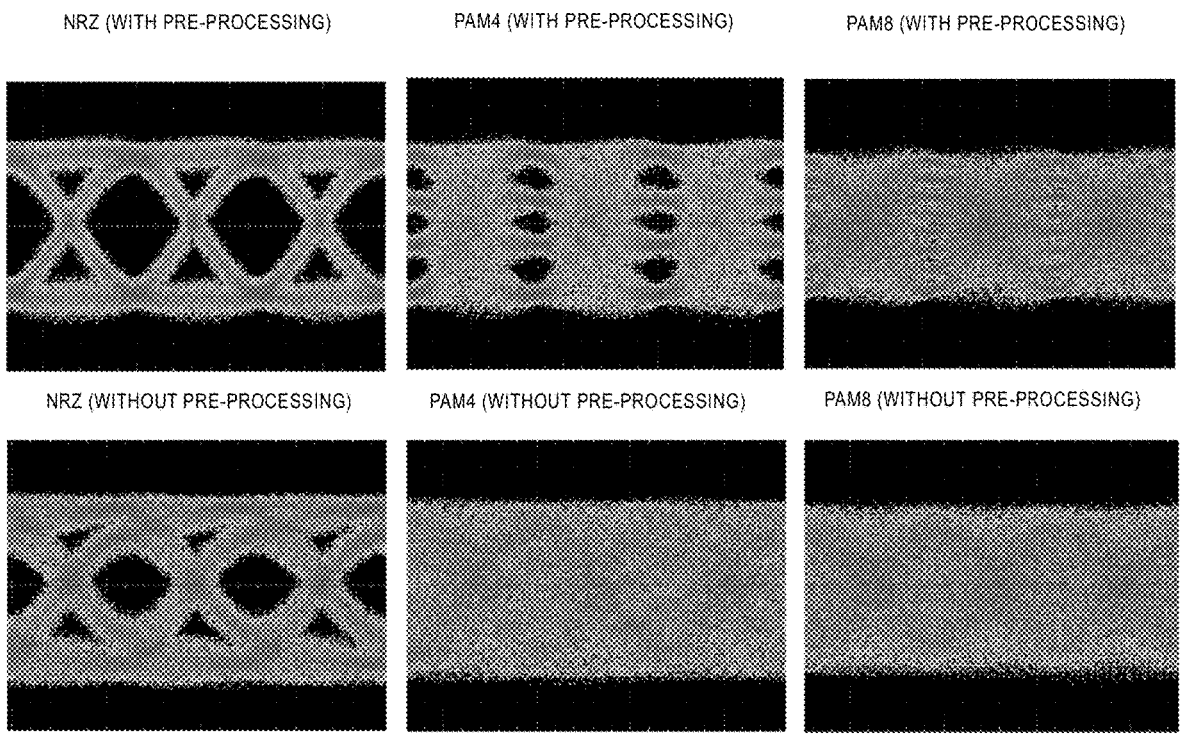
FIG. 12 illustrates a schematic diagram of comparison of pre-processing effects in accordance with embodiments of the present disclosure.

FIG. 12 illustrates a schematic diagram of comparison of the pre-processing effects. The NRZ, PAM4 and PAM8 signals are tested respectively in the optical communication system using the pre-processing approach according to the embodiments of the present disclosure and in the optical communication system without using the pre-processing. As shown, when the transmission distance is 20 KM, signal recovery is better in the optical communication system using the pre-processing according to the embodiments of the present disclosure.

Figure 13:
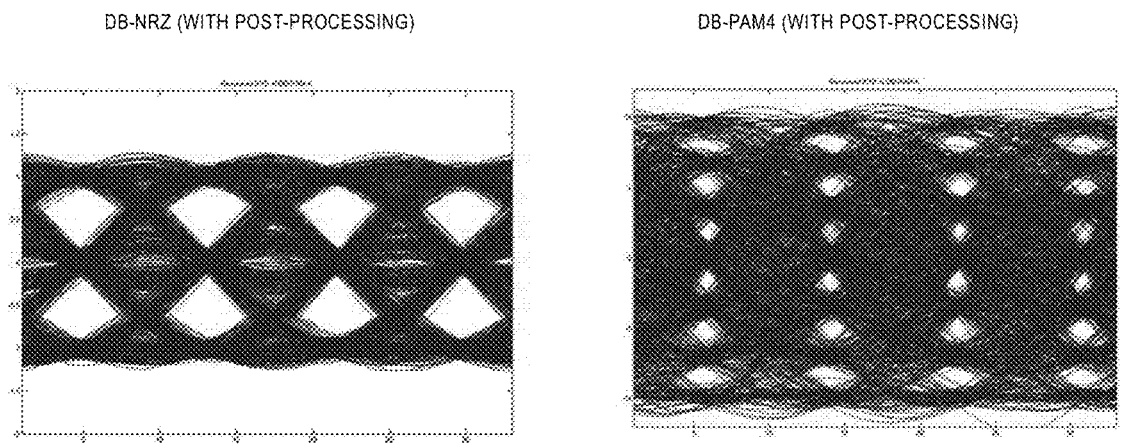
FIG. 13 illustrates a schematic diagram of post-processing effects in accordance with embodiments of the present disclosure.

FIG. 13 illustrates a schematic diagram of the post-processing effects. The DB-NRZ and DB-PAM4 signals are tested in the optical communication system using the post-processing approach according to the embodiments of the present disclosure. As shown, when the transmission distance is 20 KM, signal recovery is satisfactory in the optical communication system using the post-processing according to the embodiments of the present disclosure.

Through the teaching offered in the above description and the accompanying drawings, many modifications and other implementations of the present disclosure will be realized by those skilled in the art. Therefore, it should be appreciated that implementations of the present disclosure are not limited to specific embodiments of the present disclosure, and modifications and other implementations are intended to be included within the scope of the present disclosure. Furthermore, although the above description and the accompanying drawings describe the example embodiments in the context of some example combinations of the modules and/or functions, it should be realized that alternative implementations can provide different combinations of modules and/or functions without deviating from the scope of the present disclosure. In this regard, other combinations of modules and/or functions different from the above explicit description are also expected to fall within the scope of the present disclosure for instance. Although specific technical terms are employed here, they are used in general and descriptive meanings and bear no intentions of limiting the present disclosure.

We claim:

1. An apparatus implemented at a passive optical network device configured to perform high-rate communication via a bandwidth-limited link, the apparatus comprising:
   a first receiving module configured to receive, via the bandwidth-limited link, a training signal from an optical network unit;
   a delay module configured to obtain a delay signal by delay-sampling the training signal;
   a first determining module configured to determine, based on the delay signal, a first channel response of the bandwidth-limited link, the first channel response characterizing change of the training signal caused by the bandwidth-limited link; and
   a first compensating module configured to compensate, based on the first channel response, a communication signal received via the bandwidth-limited link from the optical network unit, to reduce distortion of the communication signal.

2. The apparatus of claim 1, wherein the first determining module is configured to:
   determine the first channel response by approximating the delay signal to a predetermined reference signal.

3. The apparatus of claim 2, wherein the first determining module is configured to:
   read the training signal previously stored in the passive optical network device; and
   obtain the reference signal by delaying and adding the training signal.

4. An apparatus implemented at a passive optical network device configured to perform high-rate communication via a bandwidth-limited link, the apparatus comprising:
   a first receiving module configured to receive, via an uplink, a training signal from an optical network unit;
   a first determining module configured to determine, based on the training signal, a first channel response of the uplink, the first channel response characterizing change of the training signal caused by a downlink; and
   a first compensating module configured to compensate, based on the first channel response, a communication signal to be transmitted via the downlink to the optical network unit, to reduce distortion to be suffered by the communication signal.

5. The apparatus of claim 4, wherein the first determining module is configured to:
   determine, based on the training signal, a first intermediate channel response of the uplink, the first intermediate channel response characterizing change of the training signal caused by the uplink; and
   determine, at least partially based on the first intermediate channel response, the first channel response.

6. The apparatus of claim 5, wherein the first determining module is configured to:
- transmit, via the downlink, the training signal to the optical network unit;
- receive, via the uplink, the training signal returned from the optical network unit;
- determine, based on the returned training signal, a second intermediate channel response, the second intermediate channel response characterizing change of the training signal caused by both the downlink and the uplink; and
- determine the second channel response based on the first intermediate channel response and the second intermediate channel response.

7. A first apparatus implemented at an optical network unit configured to perform high-rate communication via a bandwidth-limited link, the apparatus comprising:
- a first receiving module configured to receive, via a downlink, a training signal from a passive optical network device;
- a transferring module configured to transfer the training signal from the downlink to an uplink; and
- a transmitting module configured to transmit, via the uplink, the training signal back to the passive optical network device for the passive optical network device to
  - obtain a delay signal by delay-sampling the training signal,
  - determine, based on the delay signal, a first channel response of the bandwidth-limited link, the first channel response characterizing change of the training signal caused by the bandwidth-limited link, and
  - compensate, based on the first channel response, a communication signal received via the bandwidth-limited link from the optical network unit, to reduce distortion of the communication signal.

8. The first apparatus of claim 7, wherein the first receiving module is further configured to:
- receive, via the downlink, the training signal transmitted from the passive optical network device; and
- receive, via the downlink, the communication signal transmitted from the passive optical network device.

9. The first apparatus of claim 7, wherein the transmitting module is further configured to:
- transmit, via the uplink, the training signal to the passive optical network device; and
- transmit, via the uplink, the communication signal to the passive optical network device.

\* \* \* \* \*